United States Patent
Kasamatsu

(10) Patent No.: US 8,587,792 B2
(45) Date of Patent: Nov. 19, 2013

(54) COMMUNICATION DEVICE CAPABLE OF PERFORMING EASY-MAINTENANCE WHEN PERMITTED BY EXTERNAL DEVICE

(75) Inventor: Daisuke Kasamatsu, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1251 days.

(21) Appl. No.: 12/409,013

(22) Filed: Mar. 23, 2009

(65) Prior Publication Data
US 2009/0296127 A1 Dec. 3, 2009

(30) Foreign Application Priority Data
May 29, 2008 (JP) ................................ 2008-141159

(51) Int. Cl.
G06K 15/00 (2006.01)
(52) U.S. Cl.
USPC ........................................................ 358/1.13
(58) Field of Classification Search
USPC ...................................... 358/1.13, 1.15, 1.16
See application file for complete search history.

(56) References Cited

U.S. PATENT DOCUMENTS

| | | | | |
|---|---|---|---|---|
| 6,038,376 | A | * | 3/2000 | Noguchi ........................ 358/1.15 |
| 6,298,421 | B1 | | 10/2001 | Minamizawa |
| 6,980,312 | B1 | * | 12/2005 | Czyszczewski et al. ...... 358/1.15 |
| 7,992,188 | B2 | * | 8/2011 | Ohta et al. .......................... 726/1 |
| 2002/0029314 | A1 | | 3/2002 | Minamizawa et al. | |

FOREIGN PATENT DOCUMENTS

| | | |
|---|---|---|
| JP | H4-95459 | 3/1992 |
| JP | H6-225067 | 8/1994 |
| JP | H8-195879 | 7/1996 |
| JP | 9-294160 | 11/1997 |
| JP | 11-203121 | 7/1999 |
| JP | 2001-94779 | 4/2001 |
| JP | 2004-72573 | 3/2004 |
| JP | 2005-244816 | 9/2005 |
| JP | 2006-86781 | 3/2006 |
| JP | 2007-130981 | 5/2007 |

OTHER PUBLICATIONS

Japanese Official Action dated Jul. 13, 2010, together with an English-language translation.
Japanese Official Action dated Oct. 26, 2010 together with an English-language translation.

* cited by examiner

Primary Examiner — Benny Q Tieu
Assistant Examiner — Sunil Chacko
(74) Attorney, Agent, or Firm — Scully, Scott, Murphy & Presser, PC

(57) ABSTRACT

A communication device, such as multifunction peripheral, includes a communication section communicable with an external device such as a call center, a mode changing section, a communication status indicating section, and a mode change enabling section. The mode changing section changes an operation mode from a first mode to a second mode. Settings of the communication device falling in a prescribed category are not changeable in the first mode but changeable in the second mode through user's operations. The communication status indicating section indicates that communications between the communication section and the external device are established. The mode change enabling section enables the mode changing section to change the operation mode from the first mode to the second mode under a condition where the communication status indicating section indicates that communications between the communication section and the external device are established.

30 Claims, 5 Drawing Sheets

FIRST DISPLAY PATTERN

SECOND DISPLAY PATTERN

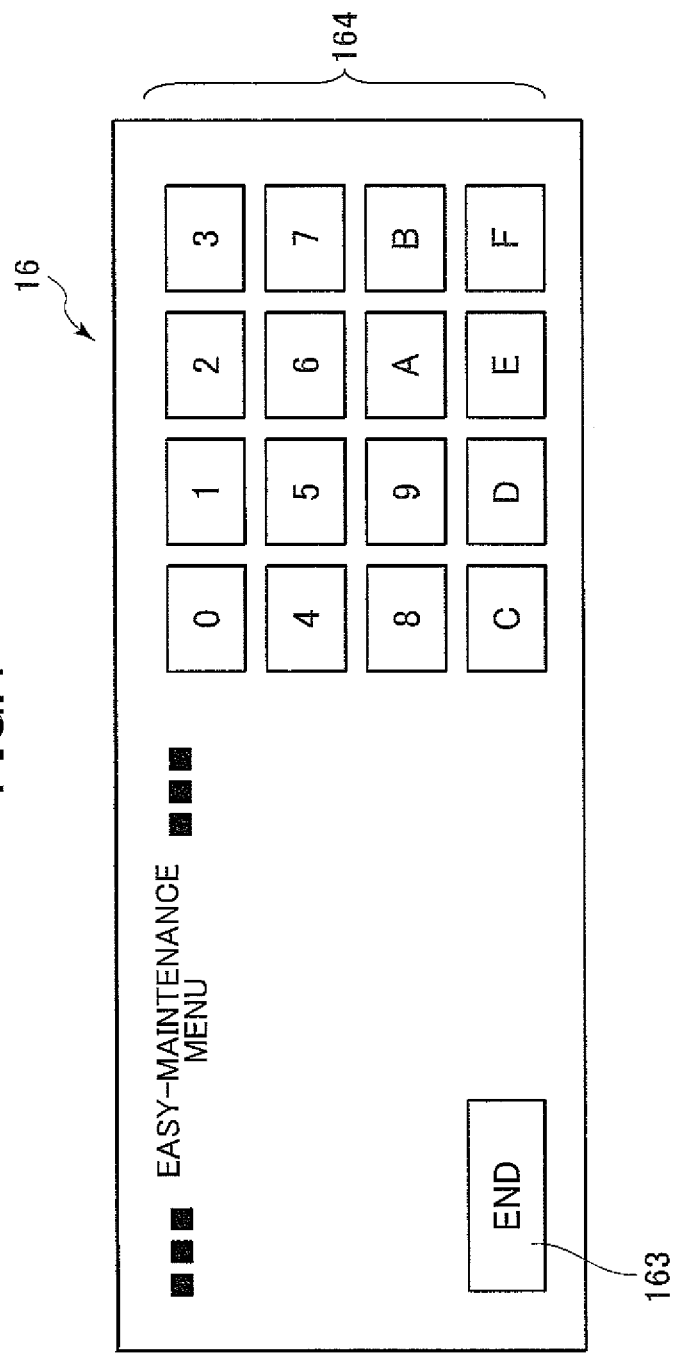

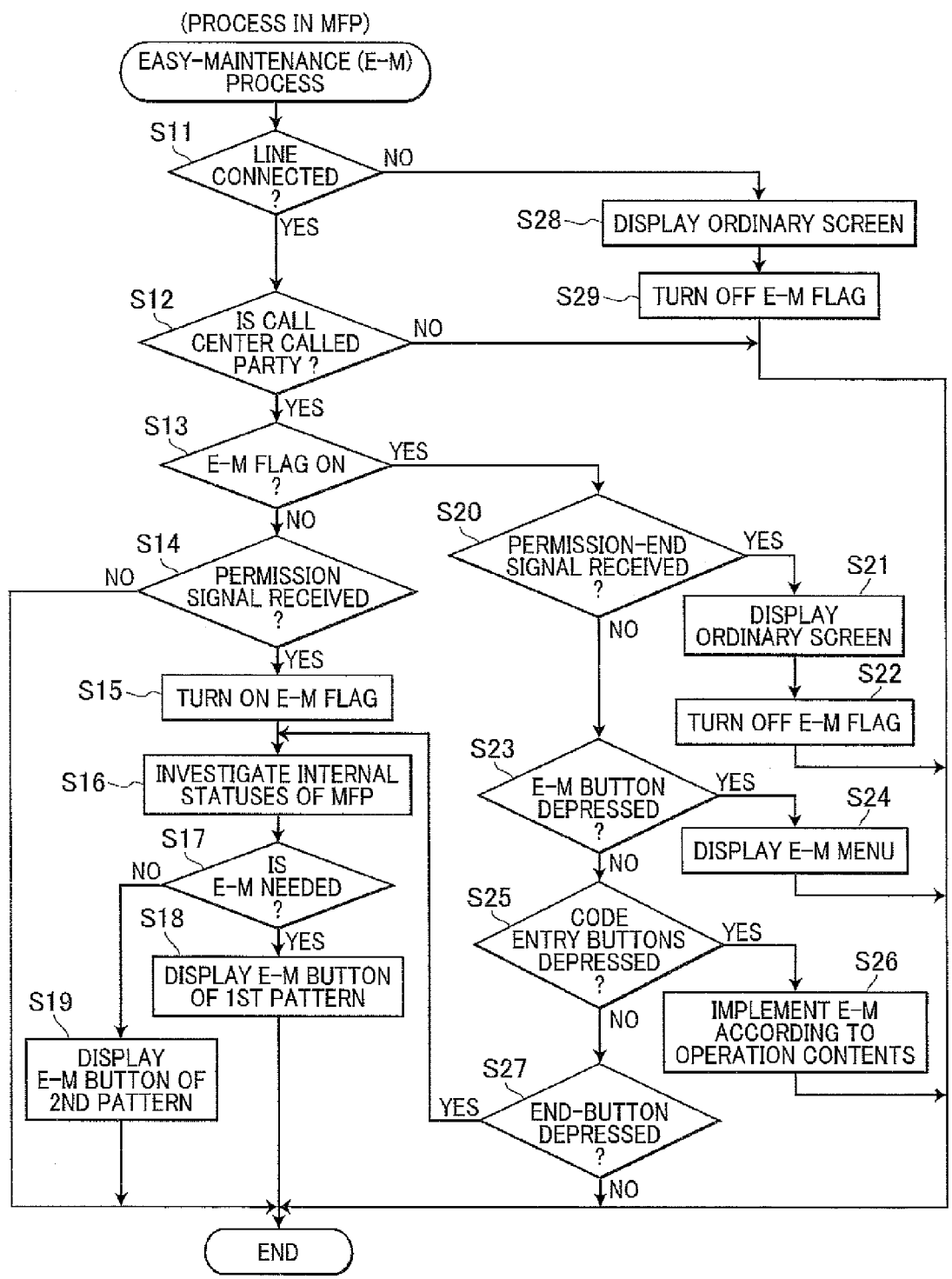

COMMUNICATION DEVICE CAPABLE OF PERFORMING EASY-MAINTENANCE WHEN PERMITTED BY EXTERNAL DEVICE

CROSS REFERENCE TO RELATED APPLICATION

This application claims priority from Japanese Patent Application No. 2008-141159 filed May 29, 2008. The entire content of the priority applications is incorporated herein by reference.

BACKGROUND OF THE INVENTION

1. Field of the Invention

The present invention relates to a communication device, and more particularly to a communication device capable of performing an easy-maintenance under limited circumstances.

2. Description of the Related Art

Recently, communication devices communicable communication devices are complicated in their internal structure. The more the communication devices are complicated, the more troubles tend to occur. Serious troubles may only be resolved by a service person from a manufacturer but minor troubles can be easily resolved through simple manipulations.

Japanese Patent Application Publication No. 11-203121 discloses a communication device capable of setting an easy-maintenance mode by sequentially depressing pre-selected operation keys in a predetermined order. In the communication devices that can be selectively set to the normal mode and the easy-maintenance mode, internal settings of the communication device falling in a prescribed category are not changeable in the normal mode but changeable in the easy-maintenance mode through user's operations. When minor troubles occur in the communication device, the user can change the internal settings of the communication device and resolve the trouble. To this effect, the communication device is changed to the easy-maintenance mode and change of the internal settings is performed in accordance with support information provided by a call center. The use of easy-maintenance is meritorious for both the user and the service person, as the user can resolve minor troubles by himself or herself and the service person is released from a burden to attend to resolving the troubles.

However, with the communication device disclosed in Japanese Patent Application Publication No. 11-203121, the change to the easy-maintenance mode is allowed insofar as relevant key operations are performed. As such, the easy-maintenance mode may inadvertently be set and the internal setting of the device may erroneously be changed despite the fact that the device is operating normally.

SUMMARY OF THE INVENTION

The present invention has been made to solve the above-mentioned problems accompanying the prior art, and therefore it is an object of the invention to provide an improved communication device in which change of the internal settings can be made under limited circumstances.

To achieve the above and other objects, there is provided a communication device that includes a communication section communicable with an external device, a mode changing section, a communication status indicating section, and a mode change enabling section. The mode changing section is configured to change an operation mode from a first mode to a second mode. Settings of the communication device falling in a prescribed category are not changeable in the first mode but changeable in the second mode through user's operations. The communication status indicating section is configured to indicate that communications between the communication section and the external device are established. The mode change enabling section enables the mode changing section to change the operation mode from the first mode to the second mode under a condition where the communication status indicating section indicates that communications between the communication section and the external device are established.

In accordance with another aspect of the invention, there is provided a method of controlling a communication device to be selectively operable in a first mode and a second mode wherein settings of the communication device falling in a prescribed category are not changeable in the first mode but changeable in the second mode through user's operations The method includes indicating that communications between the communication device and the external device are established; enabling the operation mode to change from the first mode to the second mode after execution of the indicating step; and changing the operation mode from the first mode to the second mode after execution of the enabling step.

In accordance with another aspect of the invention, there is provided a computer-readable storage medium storing a set of program instructions installed on and executed by a computer for controlling a communication device to be selectively operable in a first mode and a second mode wherein settings of the communication device falling in a prescribed category are not changeable in the first mode but changeable in the second mode through user's operations. The set of program instructions includes: indicating that communications between the communication device and the external device are established; enabling the operation mode to change from the first mode to the second mode after execution of the indicating program instruction; and changing the operation mode from the first mode to the second mode after execution of the enabling program instruction.

BRIEF DESCRIPTION OF THE DRAWINGS

The particular features and advantages of the invention as well as other objects will become apparent from the following description taken in connection with the accompanying drawings, in which:

FIG. 4 is an explanatory diagram showing a "easy-maintenance menu" displayed on the LCD; and FIG. 5 is a flowchart illustrating an easy-maintenance process to be executed by the MFP.

DETAILED DESCRIPTION OF THE PREFERRED EMBODIMENTS

An embodiment of the invention will be described while referring to the accompanying drawings.

Figure 1:
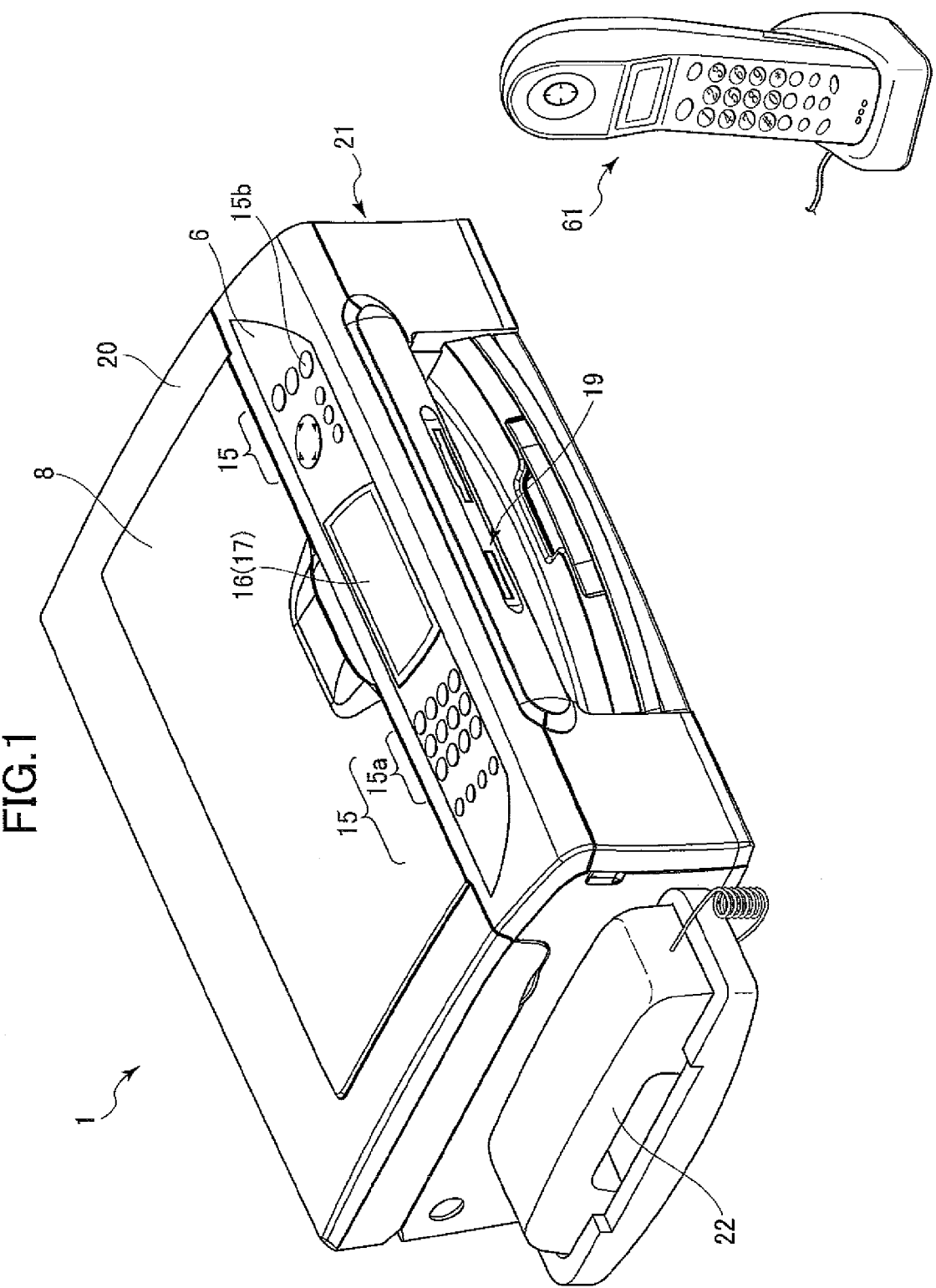
FIG. 1 is a perspective view showing the external appearance of a multifunction peripheral (MFP) according to one embodiment of the invention.

As shown in FIG. 1, the MFP 1 is a versatile peripheral device having a facsimile transmission/reception function, a telephone function, a printer function for printing images based on data received from a personal computer (PC), a scanner function, and a copier function.

The MFP 1 is operable either in a "normal mode" or in an "easy-maintenance mode". In the normal mode, the various parts of the MFP 1 can be used normally. In the easy-maintenance mode, the internal settings of the MFP 1 that cannot be changed in the normal mode can be changed through the user operations. When some troubles occur in the MFP 1, the user can resolve the trouble by firstly setting the MFP 1 in the easy-maintenance mode and then changing some internal settings in accordance with product support information provided from a call center operated by a company. In the normal mode, the various functions provided in the MFP 1 are available. For example, voice communications can be established using the telephone function, and transmission and reception of facsimile data to and from a remote facsimile apparatus can be performed using the facsimile transmission/reception function.

If the user can change the operation mode from the normal mode to the easy-maintenance mode without any restriction, the MFP 1 may accidentally enter into the easy-maintenance mode and the internal settings of the MFP 1 may be changed unintentionally. With the MFP according to the embodiment of the invention, entry into the easy-maintenance mode is possible under limited circumstances and hence change of the internal settings cannot be freely made.

As shown in FIG. 1, a scanner 20 is disposed on the upper part of the MFP 1 for scanning an original document when the facsimile function, scanner function, or copier function is used. The scanner 20 includes a glass plate (not shown) for supporting an original, an original cover 8 capable of being rotated open and closed over the glass plate, and a sensor (not shown) such as a compact image sensor (CIS) or a charge coupled device (CCD) disposed beneath the glass plate for scanning the original positioned on the glass plate. An inkjet printer 21 is housed in the MFP 1 for recording images on recording paper.

A rectangular control panel 6 elongated laterally is provided on the front side of the original cover 8. The control panel 6 includes operating keys 15 and a liquid crystal display (LCD) 16. The operating keys 15 include various keys such as number keys 15a for inputting the telephone or fax number of a transmission destination, and a power button 15b for turning the MFP 1 on and off.

The LCD 16 includes an LCD panel (not shown), and an LCD controller (not shown) for controlling the LCD panel to display images thereon. The LCD panel displays the operating procedures, and the status of the operation being executed. The LCD panel also displays data inputted through depressions of the operating keys 15 or through a touch to a touch screen 17 (to be described later). As will be described in detail with reference to FIGS. 3A, 3B and 4, through the telephone communications between the user and the support person in the call center, the MFP 1 receives a permission signal from the call center for permitting the MFP 1 to enter into the easy-maintenance mode. Upon receipt of the permission signal, the LCD 16 of the MFP 1 displays an easy-maintenance button 161 or 162 on the LCD 16 (see FIGS. 3A and 3B).

The touch screen 17 serving as an input device is provided on the surface of the LCD panel. The touch screen is capable of detecting presence and location of a touch within the LCD display panel. When the user touches the easy-maintenance button 161 or 162 displayed on the LCD 16 with his or her finger, the operation mode of the MFP 1 is set to the easy-maintenance mode. When the MFP 1 is set to the easy-maintenance mode, the LCD 16 displays a "easy-maintenance menu" (see FIG. 4). Operation of the easy-maintenance menu through the touch screen 17 makes it possible to enter into the easy-maintenance mode and change the internal settings of the MFP 1.

A memory card slot 19 is formed on the front surface of the MFP 1 to allow a memory card 19a (see FIG. 2) to be inserted thereinto. When the memory card 19a is inserted into the memory card slot 19, images corresponding to image data stored in the memory card 19a are displayed on the LCD 16. Images selected by the user through the touch screen 16 are printable using the printer 21.

Figure 2:
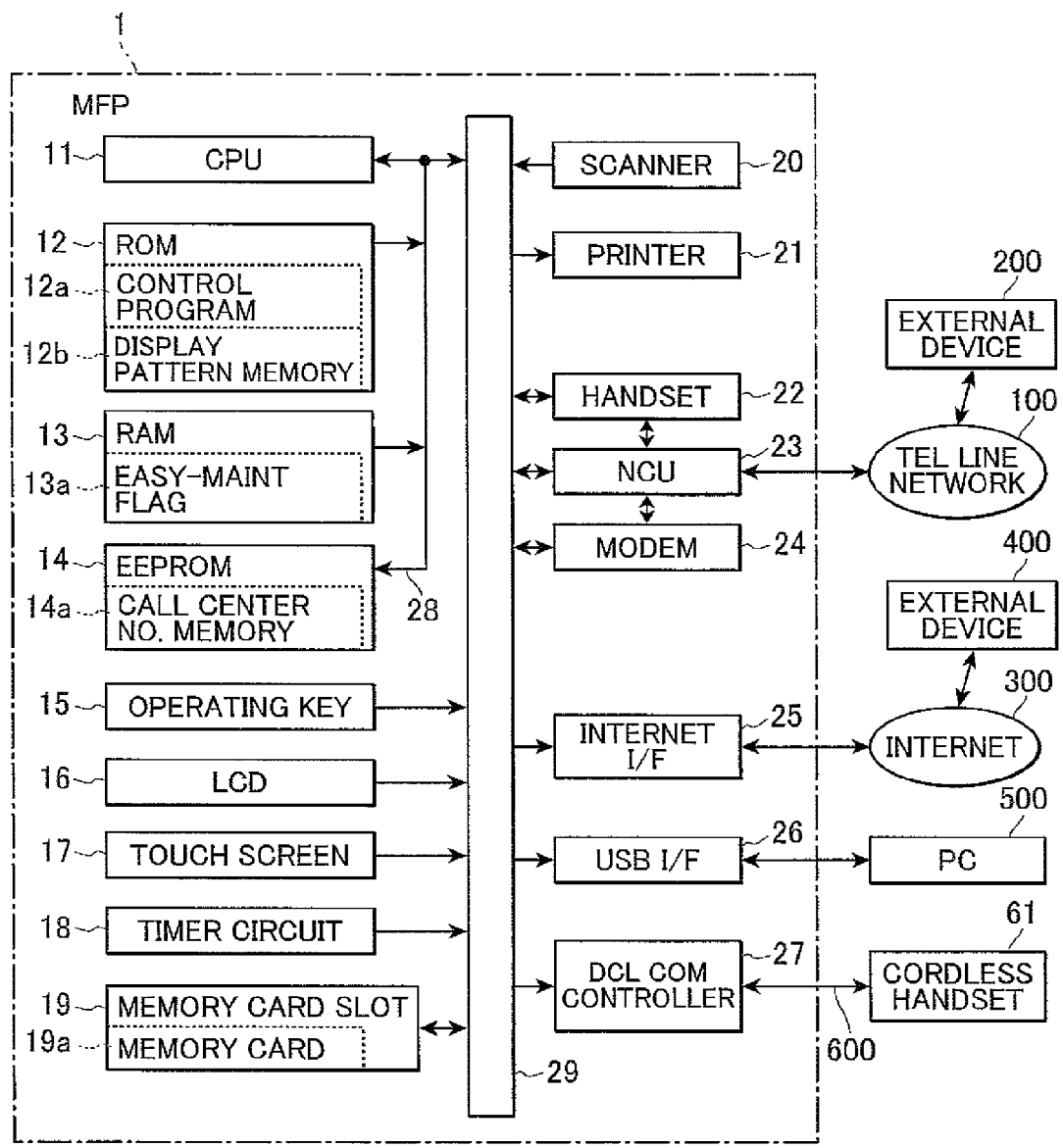
FIG. 2 is a block diagram showing the electrical structure of the MFP.

A handset 22 is attached to one side of the MFP 1 and is used for making a phone call to an external device 200 connected to the MFP 1 through a telephone network 100 (see FIG. 2).

In addition to the handset 22, a digital cordless handset 61 is usable with the MFP 1. The MFP 1 houses a circuit board (not shown) on which mounted is a digital cordless communications controller 27 (hereinafter referred to as "DCL communications controller 27") for making wireless communications 600 (see FIG. 2) with the digital cordless handset 61. The cordless handset 61 makes wireless communications with the MFP 1 through the DCL communications controller 27 to allow telephone communications to be established between the handset 22 and the cordless handset 61 or between the external device 200 and the digital handset 61 through the telephone network 100.

Although not shown in any of the drawings, a telephone line terminal, a LAN (local area network) terminal, and a USB (universal serial bus) terminal are provided on the other side of the MFP 1. Connection of a telephone line to the telephone line terminal makes an NCU (network control unit) 23 of the MFP 1 to connect to the telephone line network 100 (see FIG. 2). Telephone communications can thus be established between the MFP 1 and the external device 200 through, the telephone line network 100.

Connection of a LAN cable to the LAN terminal makes an internet interface 25 to connect to Internet 300 (see FIG. 2). Communications can thus be established between the MFP 1 and the external device 300 through Internet 300.

A PC 500 can be connected to the MFP 1 by connecting one end of a USB cable to the PC 500 and another end to the USB interface 26 (see FIG. 2) of the MFP 1. Under a condition where the PC 500 is connected to the MFP 1, the PC 500 can issue execution commands to the MFP 1 to execute the printer function (PC print function, media print function), the scanner function and the like. Also, the PC 500 can perform various kinds of settings of the MFP 1.

Next, the electrical structure of the MFP 1 will be described with reference to FIG. 2. The MFP 1 primarily includes CPU (central processing unit) 11, ROM (read-only memory) 12, RAM (random access memory) 13, EEPROM (electrically erasable and programmable read only memory) 14, operating keys 15, LCD 16, touch screen 17, timer circuit 18, memory card slot 19, scanner 20, printer 21, handset 22, NCU (network control unit) 23, modem 24, internet interface 25, USB interface 26, and DCL communications controller 27.

The CPU 11, ROM 12, RAM 13 and EEPROM 14 are mutually connected via bus lines 28. The operating keys 15, LCD 16, touch screen 17, timer circuit 18, memory card slot 19, scanner 20, printer 21, handset 22, NCU 23, modem 24, internet interface 25, USB interface 26, DCL communications controller 27, and bus lines 28 are mutually connected via an I/O (input/output) port 29.

The CPU 11 controls the components connected to the I/O port 29 and the functions of the MFP 1 based on fixed values and programs stored in the ROM 12, RAM 13, and EEPROM 14 and further based on various signals transmitted out or received through the NCU 23, internet interface 25, USB interface 26, and DCL communications controller 27.

The ROM 12 is a non-rewritable, non-volatile memory for storing control programs 12a executed on the MFP 1 and fix values referred to by the control programs 12a. The program for executing the easy-maintenance process as shown in the flowchart of FIG. 5 is included in the control programs 12a. Through execution of the easy-maintenance process by the CPU 11, various controls are implemented including display of the easy-maintenance buttons 161, 162 when it is permitted to enter into the easy-maintenance mode, display of the easy-maintenance menu, and change in the internal settings of the MFP 1. Details of the easy-maintenance process will be described with reference to FIG. 5.

The ROM 12 includes a display pattern memory 12b for storing data for display patterns capable of being displayed on the LCD 16 depending upon a status of the MFP 1. The display pattern memory 12b stores data for various kinds of buttons including the easy-maintenance buttons 161, 162 (see FIG. 3), end button 163 (see FIG. 4), code input button 164 for inputting easy-maintenance code, together with corresponding background pattern for the LCD 16 and a time display pattern.

The CPU 11 determines a display pattern to be displayed on the LCD 16 based on the status of the MFP 1. The CPU 11 retrieves all the necessary display patterns from the display pattern memory 12b and generates a single frame image to be displayed in a predetermined region on the LCD panel Then, the CPU 11 displays the frame image in the designated region of the LCD panel.

The RAM 13 is a rewritable, volatile memory for temporarily storing various kinds of data at a time when the MFP 1 is operated. The RAM 13 includes an easy-maintenance flag 13a. The easy-maintenance flag 13a notifies the user that operations for entering into the easy-maintenance mode is permitted when the flag 13a is on whereas operations for entering into the easy-maintenance mode is not permitted when the flag 13a is off.

In the easy-maintenance process (see FIG. 5) executed by the CPU 11, when receipt of a permission signal transmitted from the call center is acknowledged at the MFP 1 during telephone communications between the MFP 1 and the call center, the easy-maintenance flag 13a is turned on (S15). The permission signal indicates that entry into the easy-maintenance mode is permitted by the call center. During the easy-maintenance flag 13a being held on (YES in S13), controlled are the display of the easy-maintenance buttons 161, 162 (S24), entry into the easy-maintenance mode, display of the easy-maintenance menu (S24), and the change in the internal settings of the MFP 1 (526).

On the other hand, when receipt of a permission-end signal transmitted from the call center is acknowledged at the MFP 1 during the easy-maintenance flag 13a being on, the display on the LCD panel relating to the easy-maintenance mode is terminated in the easy-maintenance process. Then, an initial screen appears on the LCD 16 following termination of the display for the easy-maintenance mode (S21) and the easy-maintenance flag 13a is turned off (S22). The permission-end signal indicates that entry into the easy-maintenance mode is not permitted. When an open (disconnecting) state of the telephone line connecting the MFP 1 and the call center is acknowledged, the initial screen appears on the LCD 16 (S21) and the easy-maintenance flag 13a is turned off (S22).

Turning off the easy-maintenance flag 13a enables the MFP 1 to operate in the normal mode in which the easy-maintenance buttons 161, 162 are not displayed on the LCD 16 so as not to permit the user to enter into the easy-maintenance mode.

The EEPROM 14 is a rewritable, non-volatile MFP 1 is turned off. The EEPROM 14 stores settings of the functions to be implemented by the MFP 1. Because the settings of the functions are preserved even when the power to the MFP 1 is turned off, the MFP 1 can be operated with the settings immediately before the MFP 1 is turned off when powered again.

The EEPROM 14 is provided with a call center number memory 14a having a storage area in which a telephone number of a call center operated by the maker is written at the time of shipment. In order to cope with the change of the call center telephone number, the call center number memory 14a is rewritably configured. Rewriting the call center number memory 14a can be achieved by operating the relevant buttons displayed on the LCD 16 and operating keys 15. Alternatively, this can be achieved by receiving an update program regarding the call center telephone number from the external device 400 of the call center through Internet and the CPU 11 executing the update program.

The contents of the call center number memory 14a are referred to during the easy-maintenance process executed by the CPU 11 in order to check whether the called device (external device 200) to which the MFP 1 is connected through the telephone line is actually the call center.

The call center number memory 14a is capable of storing a plurality of call center telephone numbers. When the telephone number of the called device (external device 200) is in coincidence with one of the plurality of telephone numbers stored in the call center number memory 14a, determination can be made so that the external device to which the MFP 1 is connected is the call center.

Some internal settings of the MFP 1 stored in the RAM 13 or EEPROM 14 (hereinafter referred to as "special internal settings") are not capable of being changed by the user when the MFP 1 is operating in the normal mode. Only when the MFP 1 is operating in the easy-maintenance mode, the special internal settings can be changed by the user. That is, the user is permitted to change the special internal settings by placing the MFP 1 in the easy-maintenance mode and recover abnormalities occurring on the MFP 1.

The timer circuit 18 is a conventionally well known chip having a time measuring function for measuring time to indicate current time. The NCU 23 is connected to the telephone line network 100 and controls the transmission of dialing signals to the telephone line network 100, a response to calling signals from the telephone network 100, and the like.

Under the operation of the telephone function of the MFP 1, the voice signal inputted through the telephone line network 100 is transmitted to the handset 22 through the NCU 23 or to the cordless handset 61 through the NCU 23 and the DCL communications controller 27. Based on the voice signal transmitted to the handset 22 or the cordless handset 61, voice is reproduced from a speaker (not shown) of the handset 22 or the cordless handset 61. Voice received at a microphone (not shown) of the handset 22 or the cordless handset 61 is converted to a digital signal and the latter is outputted to the telephone line network 100 through the NCU 23 in the case of the handset 22 or through the NCU 22 and the DCL communications controller 27 in the case of the cordless handset 61.

Upon receipt of predetermined control signals including the permission signal and permission-end signal transmitted from the external device 200, the NCU 23 sends an interruption signal to the CPU 22 and stores the control signals received from the external device 200 in the RAM 13.

The modem 24 functions to modulate image data being transmitted with the facsimile function to signals that can be transferred over the telephone line network 100 and to transmit these signals via the NCU 23, and to receive signals inputted from the telephone line network 100 via the NCU 23 and demodulate the signals into image data that can be displayed on the LCD 16 or recorded on recording paper with the printer 21.

The Internet interface 25 is provided for connecting the MFP 1 to internet 300. Using an Internet protocol, transmission of data to and reception of data from the external device 400 connected to Internet are implemented. The LAN terminal (not shown) is provided in the Internet interface 25 to project outward from the side wall of the MFP housing. The MFP 1 is connected to Internet through the LAN cable connected to the LAN terminal.

The USB interface 26 is provided for transmitting data in accordance with the USB standard. The USB terminal is provided in the USB interface 26 to project outward from the side wall of the MFP housing. The MFP 1 is connected to the PC 500 through the USB cable connected to the USB terminal.

The DCL communications controller 27 is provided with a DCL antenna (not shown) and implements transmission/reception of digital voice signals to and from the cordless handset 61 also provided with the DCL antenna of the same type while performing wireless communications 600 between the MFP 1 and the cordless handset 61.

Figure 3A:
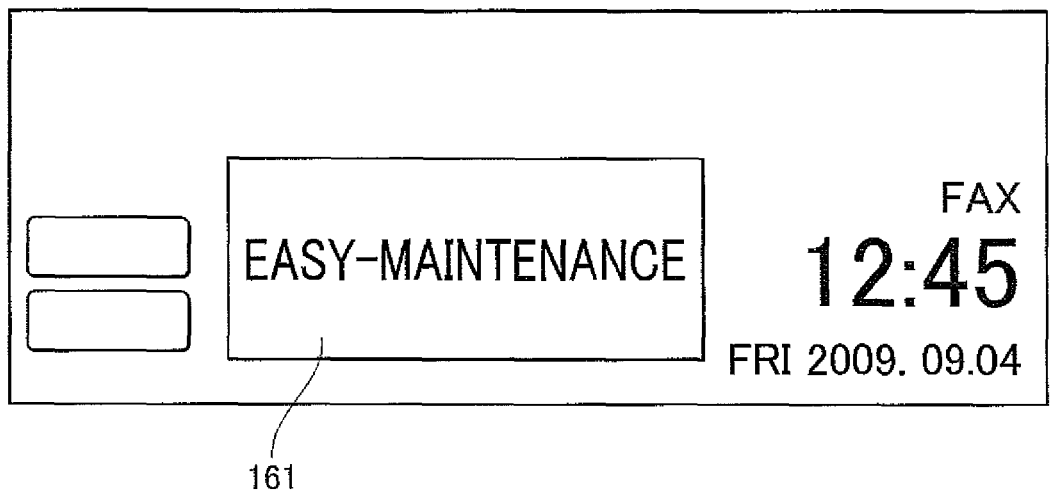
FIG. 3A is an explanatory diagram showing an "easy-maintenance button" displayed on an LCD in a first display mode.
Figure 3B:
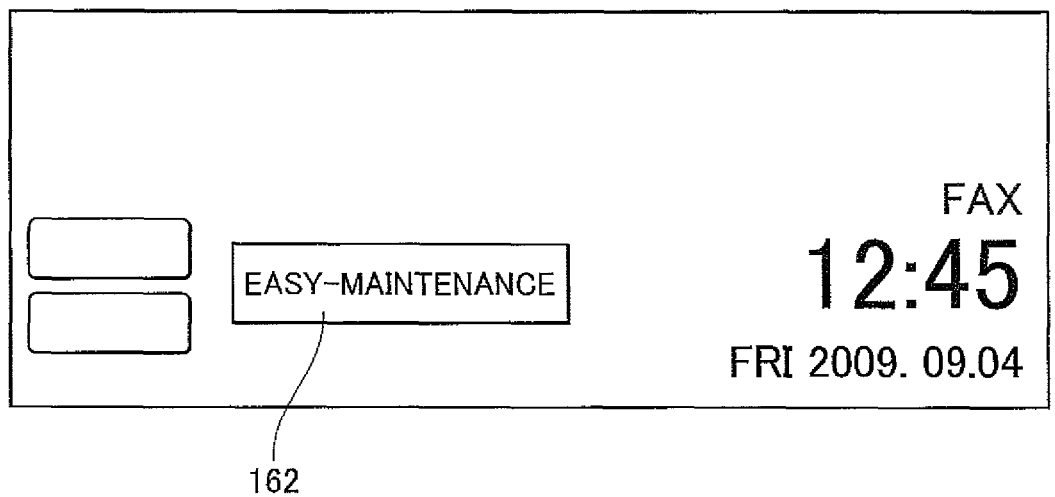
FIG. 3B is an explanatory diagram showing an "easy-maintenance button" displayed on an LCD in a second display mode.

Next, the easy-maintenance button will be described while referring to FIGS. 3A and 3B. The easy-maintenance button is displayed on the LCD 16 when the MFP 1 receives the permission signal from the call center indicating that entry into the easy-maintenance mode is permitted. FIG. 3A shows a first display pattern of a large-size easy-maintenance button and FIG. 3B shows a second display pattern of a small-size easy-maintenance button.

The MFP 1 according to the embodiment of the invention has two display patterns. As shown in FIG. 3A, the first display pattern displays the easy-maintenance button 161 in a large size. The second display pattern displays the same button in a small size as denoted by reference numeral 162 in FIG. 3B.

Selection of the first display pattern or the second display pattern is determined in the easy-maintenance process executed by the CPU 11. More specifically, when the permission signal is received from the call center (YES in S16 of the flowchart shown in FIG. 5) during voice communications between the MFP 1 and the call center using the telephone function, the easy-maintenance process detects the internal statuses of the MFP 1 (S16).

The internal statuses of the MFP 1 is investigated by firstly detecting various kinds of data including variable numbers and set values from the RAM 13 and EEPROM 14, and also various kinds of signals from various parts connected to the I/O port, including the card slot 19, scanner 20, printer 21, handset 22, NCU 23, modem 24, Internet interface 25, USB interface 16, and DCL communications controller 27, and then analyzing those data and signals with the CPU 11.

When the investigated results of the internal statuses of the MFP 1 indicate that the MFP 1 is in need of the easy-maintenance, the first display pattern is selected in which the easy-maintenance button 161 is displayed in a large size. On the other hand, when the investigated results indicate that the easy-maintenance is not necessary, the second display pattern is selected in which the easy-maintenance button 162 in displayed in a small size.

As described, whether the easy-maintenance is necessary or not is determined based on the internal statuses of the MFP 1. Either the first display pattern or the second display pattern is selected depending on whether the easy-maintenance is necessary or not. As such, the user can readily recognize whether the easy-maintenance is necessary or not from the size of the easy-maintenance button 161 or 162. In the case where the easy-maintenance is necessary, the large-size easy-maintenance button 161 displayed on the LCD 16 can draw the user's attention and the user can recognize the necessity for the entry into the easy-maintenance.

The MFP 1 according to this embodiment is set to be in an easy-maintenance required condition if, for example, the internal status investigation results indicate that the printer 21 is incapable of printing image data despite the fact that the modem 24 receives the image data through facsimile transmission and the RAM 13 stores the received image data. To implement the easy-maintenance for this trouble, a relevant special internal setting stored in the RAM 13 or EEPROM 14 is turned on so that a facsimile data transfer function can be active. When the easy-maintenance for enabling the facsimile data transfer function is ended, the image data stored in the RAM 13 is transferred to the designated external device.

Further, when the internal status investigation results indicate that paper jam has been occurred in the printer 21, it is determined that the easy-maintenance is necessary. To implement the easy-maintenance for the paper jam trouble, a relevant special internal setting stored in the RAM 13 or EEPROM 14 is turned on so that the paper jam is resolved. When the easy-maintenance for the paper jam trouble is ended, the carriage for reciprocally moving an inkjet head in a main scanning direction is moved to a predetermined position, e.g., a center position between the movable range of the carriage in the main scanning direction, thereby allowing the user to easily remove a sheet of paper or a small piece of paper without being obstructed by the carriage.

The easy-maintenance is determined to be necessary when the modem 24 outputs signals indicating that a number of errors is occurring during reception of the facsimile data or when the Internet interface 25, USB interface 26 or DCL communications controller 27 outputs signals indicating that a number of errors is occurring during communications between the Internet interface 25 and the external device 400, between the USB interface 26 and the PC 500, or between the DCL communications controller 27 and the cordless handset 61. Such communication errors can be resolved with implementation of the easy-maintenance in which relevant special internal settings concerning the communication method are changed.

Further, the easy-maintenance is determined to be necessary when data stored in the RAM 13 indicates that the number of printed sheets of paper has exceeded a set number or when an abnormality has been occurring inside the MFP 1 such that the internal status investigation results has been occurring. The easy-maintenance can display the number of printed sheets of paper or other setting information on the LCD 16.

Next, how the easy-maintenance menu is displayed on the LCD 16 will be described with reference to the diagram shown in FIG. 4. The easy-maintenance menu is displayed on the LCD 16 when the easy-maintenance mode is selected by the user, that is, when the easy-maintenance button 161 or 162 is depressed.

As shown in FIG. 4, the easy-maintenance menu displayed on the LCD 16 includes an end button 163 and code entry buttons 164. The end button 163 is used for changing the easy-maintenance mode to the normal mode.

When the end button 163 is depressed by the user, the operation mode of the MFP 1 is set to the normal mode and also the easy-maintenance menu is switched to the screen shown in FIG. 3A or 3B in which the easy-maintenance button is displayed either in the first or the second display pattern. The easy-maintenance button 161 or 162 is displayed on the LCD 16 until the MFP 1 receives the permission-end signal from the call center or the telephone line between the MFP 1 and the call center is disconnected. The permission-end signal is a signal for notifying the MFP 1 that permission to change to the easy-maintenance mode is ended.

A condition capable of retuning to the easy-maintenance mode is preserved even if the end button 163 is depressed as far as the permission-end signal is not received from the call center and connection of the telephone line between the MFP 1 and the call center is maintained. Accordingly, during a period of time when depression of the easy-maintenance button 161 or 162 resumes the easy-maintenance mode and displays the easy-maintenance menu on the LCD 16.

The code entry buttons 164 are used to input an easy-maintenance code. The user can input the easy-maintenance code instructed by the operator of the call center through manipulation of the code entry buttons 164.

The easy-maintenance code entered during the easy-maintenance process is analyzed, and the special internal setting corresponding to the entered easy-maintenance code is displayed on the LCD 16. When the change of the special internal settings is entered by the user, the RAM 13 or EEPROM 14 is rewritten to reflect the change of the special internal settings (S26).

Next, the easy-maintenance process to be executed by the CPU 11 will be described while referring to the flowchart shown in FIG. 5. Easy-maintenance process includes displaying the easy-maintenance button 161 or 162 when execution of the easy-maintenance is permitted, changing the operation mode from the normal mode to the easy-maintenance mode and displaying the easy-maintenance menu, and changing the special internal settings of the MFP 1. The easy-maintenance process is repeatedly executed in the main process as far as the MFP 1 is powered.

In the easy-maintenance process, it is firstly determined based on the operating status of the NCU 23, whether or not the MFP 1 and the external device 200 are connected via the telephone line network 100 (S11). When determination made in S11 is affirmative (YES in S11), i.e., connection to the external device 200 is established, it is further determined whether or not the telephone apparatus of the called party belongs to the external device 200 (S12). In this embodiment, a call center offering telephone-based user support information of the MFP 1 corresponds to the external device 200 to be called. In short, whether or not the call center is called is determined in S12.

Determination in S12 is made by comparing the telephone number of the called party (call center), which is stored in the RAM 13 by the NCU 23, with the telephone numbers of the call centers stored in the call center number memory 14a. The fact that the calling telephone number is in coincidence with a telephone number of the call center stored in the call center number memory 14a means that the telephone apparatus of the called party belongs to the call center. On the other hand, the fact that the calling telephone number is not included in the telephone numbers stored in the call center number memory 14a means that the telephone apparatus of the called party is not the one belonging to the call center.

When the MFP 1 calls the call center, the NCU 23 recognizes the calling telephone number from the sequence of depressions of the number keys 15a and stores the telephone number thus recognized in the RAM 13. On the other hand, when the MFP 1 is called, it is checked whether or not the calling signal is received along with a notification of the telephone number of the calling party. When the notification of the telephone number is received, the telephone number of the calling party is extracted from the notification and the extracted telephone number is stored in the RAM 13.

Turning back to the flowchart, when determination made in S12 indicates that one of the call centers is called (Yes in S12), it is further determined whether or not the easy-maintenance flag 13a is on (S13). When the easy-maintenance flag 13a is off (NO in S13), the user is not permitted to enter into the easy-maintenance mode at this stage. It is subsequently determined whether or not the permission signal has been received from the call center (S14). Receipt of the permission signal indicates that entry into the easy-maintenance mode is permitted.

Determination in S14 is made in such a manner that a control signal, which has been received from the call center and stored in the RAM 13 of the MFP 1, is retrieved from the RAM 13 in response to an interruption signal received from the NCU 23 and determination is made as to whether or not the control signal retrieved from the RAM 13 is the permission signal. When the control signal stored in the RAM 13 is not the permission signal or the interruption signal is not received from the NCU 23, it is determined that the permission signal has not been received (NO in S14), whereupon the easy-maintenance process is ended and the MFP 1 is held in a state not capable of entering into the easy-maintenance mode.

On the other hand, when the process in S14 reveals that the control signal stored in the RAM 13 is in fact the permission signal (Yes in S14), then the easy-maintenance flag 13a is turned on (S15), thereby placing the MFP 1 in a state capable of entering into the easy-maintenance mode.

As described above, the MFP 1 according to the present embodiment is placed in a state for permitting the user to enter into the easy-maintenance mode if connection to the call center is confirmed (Yes in S12) and if receipt of the permission signal from the call center is confirmed (Yes in S14). As such, the call center governs the MFP 1 with respect to entry into the easy-maintenance mode and restricts the opportunity for the user to change the special internal settings of the MFP 1. On the other hand, the user can recognize that entry into the easy-maintenance mode is permitted in the easy-maintenance process repeatedly executed by the CPU 11 once the easy-maintenance flag 13 has been turned on.

After execution of S15, the internal statuses of the MFP 1 are investigated. This can be accomplished by extracting data, such as variables, set values, from the RAM 13 or EEPROM 14, and receiving signals from various parts connected to the I/O port (S16). As described with reference to FIGS. 3A and 3B, it is determined whether or not the MFP 1 is in need of the easy-maintenance based on the investigated results (S17).

When it is determined that the easy-maintenance is necessary (Yes in S17), the large-size easy-maintenance button 161 is retrieved from the display pattern memory 12b and the LCD 16 is controlled to display the easy-maintenance button 161 as shown in FIG. 3A (S18), whereupon the easy-maintenance process is ended. On the other hand, when it is determined that the easy-maintenance is not necessary (No in S17), the small-size easy-maintenance button 162 is retrieved from the display pattern memory 12b and the LCD 16 is controlled to display the easy-maintenance button 162 as shown in FIG. 3B (S19), whereupon the easy-maintenance process is ended. In this embodiment, either the large-size or small-size easy-maintenance button is displayed on the LCD 162 depending on whether or not the easy-maintenance is necessary, the size of the easy-maintenance button to be displayed on the LCD 162 may be determined to be large as a level required for changing the operation mode from the normal mode to the easy-maintenance mode increases.

In this manner, either the large-size easy-maintenance button 161 or small-size easy-maintenance button 162 is displayed on the LCD 16. When hard keys are used to enter into the easy-maintenance mode, a number of keys needs to be provided or used for this purpose. In contrast, the use of soft keys as in the embodiment described above is thus advantageous in that the number of keys can be reduced and thus the cost of the MFD 1 can be reduced. Further, the easy-maintenance button 161 or 162 is displayed on the LCD 16 on an as-needed basis. Therefore, unintentional or irrelevant easy-maintenance would not be performed.

Particularly, with the MFP 1 according to the present embodiment, the LCD 16 is controlled to display the easy-maintenance button 161 or 162 only when entry into the easy-maintenance mode is permitted (Yes in S14). The MFP 1 is configured to invalidate the user's misleading instruction for changing the normal mode to the easy-maintenance mode because the easy-maintenance button 161 or 162 is not displayed on the LCD 16 unless entry into the easy-maintenance mode is permitted. As such, entry into the easy-maintenance mode is not carried out following the user's erroneous operations if entry into the easy-maintenance mode is not permitted.

Whether to display the easy-maintenance button 161, 162 is determined depending upon whether or not entry into the easy-maintenance mode is permitted (S14). Accordingly, when the easy-maintenance button 161 or 162 is not displayed on the LCD 16, the user can recognize that entry into the easy-maintenance mode is not permitted.

Further, either the large-size easy-maintenance button 161 or the small-size easy-maintenance button 162 is selected upon investigating the internal statuses of the MFP 1. Accordingly, the user can recognize the internal statuses of the MFP 1 from the size of the easy-maintenance button.

When determination made in S13 indicates that the easy-maintenance flag 13a is on (Yes in S13), the MFP 1 is permitted to enter into the easy-maintenance mode at this stage. Then, the routine proceeds to S20 and processes of S20 through S27 are executed. Execution of the processes S20 through S27 accomplishes entry into the easy-maintenance mode, display of the easy-maintenance menu, change in contents of the special internal settings, and entry into the normal mode.

Specifically, in S20, it is determined whether or not the permission-end signal has been received. The permission-end signal indicates the end of permission for entering into the easy-maintenance mode or inhibition for entering into the easy-maintenance mode. Determination in S20 is made in such a manner that a control signal, which has been received from the call center and stored in the RAM 13, is retrieved from the RAM 13 in response to an interruption signal received from the NCU 23 and determination is made as to whether or not the control signal retrieved from the RAM 13 is the permission-end signal.

When the processing in S20 reveals that the control signal stored in the RAM 13 is the permission-end signal (Yes in S20), then the LCD 16 is controlled to display a standard standby screen on which the easy-maintenance button is not included (S21). Subsequently, the easy-maintenance flag 13a is turned off (S22) and the easy-maintenance process is ended. In the absence of the easy-maintenance button 161 or 162 on the LCD 16, the user cannot enter into the easy-maintenance mode.

When determination made in S12 indicates that the called party is the call center and determination made in S20 indicates that the permission-end signal has been received, the MFP 1 is placed in a condition not capable of entering into the easy-maintenance mode. In this manner, the call center governs the MFP 1 so as not to permit to enter into the easy-maintenance mode. Also, the call center can restrict the user so as not to change the special internal settings of the MFP 1 arbitrarily.

When the easy-maintenance flag 13a is turned off, the user is not permitted to immediately enter into the easy-maintenance mode in the easy-maintenance process to be performed in the next occasion.

On the other hand, when determination made in S20 reveals that the control signal stored in the RAM 13 is not the permission-end signal or no interruption signal has been received from the NCU 23, it is determined that the permission-end signal has not been received (NO in S20). Then, it is determined whether or not the easy-maintenance button 161 or 162 displayed on the LCD 16 is depressed through the touch screen (S23). If the easy-maintenance button 161 or 162 is not displayed on the LCD 16 in the process of S23, the easy-maintenance button 161 or 162 is treated as not being depressed (NO in S23).

When the easy-maintenance button 161 or 162 is depressed (YES in S23), the MFP 1 is brought into the easy-maintenance mode and the display patterns of the buttons including the end button 163 and the code entry buttons 164 are retrieved from the display pattern memory 12b. Using the data thus retrieved, the LCD 16 is controlled to display the easy-maintenance menu (S24), whereupon the easy-maintenance process is ended. When the easy-maintenance menu is operated by the user, the operations entered in the easy-maintenance menu are reflected to the subsequently executed easy-maintenance process.

As described, depression of the easy-maintenance button 161 or 162 is the user's instruction to bring the operation mode of the MFP 1 into the easy-maintenance mode so that change to the easy-maintenance mode can be carried out by the user when needed. For example, when the user is instructed by the operator of the call center to depress the easy-maintenance button 161 or 162, the user can change the operation mode to the easy-maintenance mode. Further, because change to the easy-maintenance mode is carried out only when the user's instruction is inputted the user can recognize the change to the easy-maintenance mode.

On the other hand, when the easy-maintenance button 161 or 162 is not depressed (NO in S23), it is determined whether or not the code entry buttons 164 on the easy-maintenance menu are depressed (S25). In the processing in S25, if the easy-maintenance menu is not displayed on the LCD 16, the code entry buttons 164 are treated as not being depressed (NO in S25).

When it is determined that the code entry buttons 164 are depressed (YES in S25), the easy-maintenance is carried out depending upon the easy-maintenance code entered by the code entry keys 164 (S26). More specifically, the CPU 11 analyzes the easy-maintenance code entered and controls the LCD 16 to display the contents of the special internal settings corresponding to the easy-maintenance code and also an acceptance screen for accepting the change of the special internal settings. When the change of the special internal settings is accepted on the screen, the RAM 13 and EEPROM 14 are rewritten to reflect the change of the special internal settings. The MFP 1 can resolve the trouble occurring on the MFP 11 in accordance with the updated special internal settings.

On the other hand, when it is determined that the code entry buttons 163 are not depressed (NO in S25), it is further determined whether or not the end button 163 on the easy-maintenance menu is depressed (S27). If the easy-maintenance menu is not displayed on the LCD 16, the end button 163 is treated as not being depressed (NO in S27).

When it is determined that the end button 163 is depressed (YES in S27), the routine returns to S16 and processes in S16 et seq. are executed. Again, the easy-maintenance button 161 or 162 is displayed on the LCD 16. Specifically, the operation mode of the MFP 1 is set to the normal mode and the easy-maintenance menu screen is switched to the screen on which the easy-maintenance button 161 or 162 is displayed. The easy-maintenance button 161 or 162 does not disappear from the LCD 16 until the MFP 1 receives the permission-end signal from the call center or the telephone line between the MFP 1 and the call center is interrupted.

The internal statuses of the MFP 1 are investigated again after depression of the end button (YES in S27) for checking if there are newly occurring problems in the internal statuses of the MFP 1. Further problems may occur attendant to the recovery of the firstly discovered problem. Specifically, in S17, investigation of the internal statuses of the MFP 1 is again carried out to see if the MFP 1 is in need of further easy-maintenance size or small size is determined based on the newly investigated results.

When it is determined that the end button is not depressed (NO in S27), the easy-maintenance process is ended. Once the easy-maintenance process is ended, the one state of the easy-maintenance flag 13a is maintained as it is and the displayed contents of the LCD 16 are also maintained until the easy-maintenance process is again executed by the CPU 11.

When determination made in S12 is that the called party is not the call center (NO in S12), the easy-maintenance process is ended. As the easy-maintenance process is ended, the user is incapable of bringing the MFP 1 into the easy-maintenance mode and the MFP 1 is held in a state in which entry into the easy-maintenance mode is not permitted.

When determination made in S11 indicates that the line connection is not established (NO in S11), the LCD 11 is controlled to display a screen on which the easy-maintenance button does not appear (S28). Then, the easy-maintenance flag 13a is turned off (S29), whereupon the easy-maintenance process is ended. As such, in the absence of the permission-end signal from the call center, the MFP 1 is held in a state in which entry into the easy-maintenance mode is not permitted if the line between the MFP 1 and the call center is disconnected.

As described in detail above, the MFP 1 according to the embodiment of the invention is permitted to enter into the easy-maintenance mode when the permission signal is received from the call center through the telephone-based user support provided by the call center. In other words, entry into the easy-maintenance mode is permitted only when the telephone line connection between the MFP 1 and the call center is established, and is not permitted in other occasions. Accordingly, change of the special internal settings of the MFP 1 can only be effected under limited circumstances. Particularly, with the MFP 1 according to the above-described embodiment, the special internal settings of the MFP 1 can only be changed when the user calls the call center and wants to recover the problem occurring on the MFP 1. Under the easy-maintenance mode, the operator is capable of referring to and changing the special internal settings of the MFP 1 and is also allowed to manipulate special keys for resolving the error.

In the above-described embodiment, the easy-maintenance button 161 or 162 displayed on the LCD 16 serves as a mode changing section for changing an operation mode from the normal mode to the easy-maintenance mode. The processes executed in S11 and S12 serve as a communication status indicating section for indicating that communications between the MFP 1 and the call center are established. The easy-maintenance flag used in the easy-maintenance process serves as a mode change enabling section for enabling the mode changing section to change the operation mode from the normal mode to the easy-maintenance mode under a condition where the communication status indicating section indicates that communications between the MFP 1 and the call center are established.

Although the present invention has been described with respect to a specific embodiment, it will be appreciated by one skilled in the art that a variety of changes may be made without departing from the scope of the invention.

For example, in the above-described embodiment, the easy-maintenance process illustrated in the flowchart of FIG. 5 includes S11 in which it is determined whether or not connection of the telephone line to the external device is established. However, the process in S11 can be dispensed with. In such a case, whether the called party is the call center or not is determined in S12 irrespective of whether or not connection of the telephone line between the MFP 1 and the call center is established. When the NCU 23 of the MFP 1 does not receive a ringer tone from the called party, decision of "NO" should be made in the process of S12, that is, the called party is determined to be not the call center. When the called party is not the call center or so treated (NO in S12), the easy-maintenance process can be ended upon implementation of the processes of S28 and S29.

Further, in the flowchart shown in FIG. 5, the process in S14 can be omitted. That is, the call center may not send the permission signal to the MFP 1, or even if the call center sends the permission signal to the MFP 1, it is not absolutely necessary for the MFP 1 to check whether or not the permission signal has been received from the call center. In the case of omission of the process in S14, the flowchart should be so modified to execute the process in S15 immediately after determination made in S13 is negative (NO in S13). In this modification, even if the permission signal is not sent from the call center or receipt of the permission-end signal is not checked in the MFP 1, the easy-maintenance cannot be performed unless the telephone communications between the operator of the call center and the user are established (YES in S11 and YES in S12).

In addition, in the flowchart shown in FIG. 5, the process in S20 can also be omitted. That is, the call center may not send the permission-end signal to the MFP 1, or even if the call center sends the permission-end signal to the MFP 1, it is not absolutely necessary for the MFP 1 to check whether or not the permission-end signal has been received from the call center. In the case of omission of the process in S20, the processes of S21 and S22 should also be omitted. Thus, the flowchart should be so modified to execute the process in S23 immediately after determination made in S13 is affirmative (YES in S13). Even if the permission-end signal is not sent from the call center or receipt of the permission-end signal is not checked in the MFP 1, the easy-maintenance can only be performed during the telephone communications between the operator of the call center and the user (YES in S11 and YES in S12). Once the telephone line is disconnected (NO in S11), the easy-maintenance cannot be performed.

In the above-described embodiment, when the MFP1 is permitted to enter into the easy-maintenance mode, the easy-maintenance button 161 or 162 is displayed. However, displaying the easy-maintenance button 161 or 162 is not essential but the operation mode of the MFP 1 can be automatically set to the easy-maintenance mode without displaying the easy-maintenance button 161 or 162. In this case, the easy-maintenance menu may be displayed on the LCD 16 upon displaying a message on the LCD 16 informing that the operation mode has changed to the easy-maintenance mode. With this message, the user can recognize the entry into the easy-maintenance mode. Further, under the condition that the MFP 1 is permitted to enter into the easy-maintenance mode, the change to the easy-maintenance mode may be effected when a prescribed signal is transmitted from the call center to the MFP 1 and when the MFP 1 detects the prescribed signal.

In the above-described embodiment, entry into the easy-maintenance mode is permitted during telephone communications between the user and the operator in the call center via the telephone line network 100. However, the telephone-based communications is not essential but any other communications are also available. For example, provided that the MFP 1 has an Internet protocol telephone function, the communications between the MFP 1 and the call center may be made with IP phones through Internet 300 and entry into the easy-maintenance mode may be permitted through the IP phone communications. In the case of the IP phone-based communications, determination as to whether or not the communications have established between the MPF 1 and the call center is made by comparing a user ID for the IF phone stored in the call center number memory 14a with a user ID of a called party extracted during the IP telephone communications.

In the above-described embodiment, determination as to whether or not the communications has been established between the MPF 1 and the call center is made by comparing the call center telephone number stored in the call center number memory 14a with the telephone number of the called party obtained during the telephone communications. However, identification of the called party may be made in different way. For example, the MFP 1 may determine that the called party is correctly specified based on an identification signal received from the called party.

In the above-described embodiment, the large-size or small-size easy-maintenance button is selectively displayed on the LCD 16 depending upon whether or not the easy-maintenance is necessary. However, it is not essential upon whether or not the easy-maintenance is necessary. Instead, one selected from the group consisting of color, shape and display position of the easy-maintenance button may be changed depending upon whether or not the easy-maintenance is necessary. Alternatively, at least two selected from the group consisting of size, color, shape and display position of the easy-maintenance button may be changed.

When the types of the easy-maintenance button are distinguished by color, it is desirable that a loud, conspicuous color, such as red, be used for the easy-maintenance button for depression when the easy-maintenance is necessary. The use of a loud color for the easy-maintenance button is effective for the user to recognize that the MFP 1 is in a state necessary for performing easy-maintenance.

When the types of the easy-maintenance button are distinguished by the display position on the LCD 16, it is desirable that the easy-maintenance button for entering into the easy-maintenance mode be positioned around the center of the LCD 16. The centrally positioned easy-maintenance button is effective in drawing the user's attention. It should be noted that when easy-maintenance is deemed unnecessary, the easy-maintenance button may not be displayed.

In the above-described embodiment, the easy-maintenance button is displayed on the LCD 16. However, it is not essential to display the easy-maintenance button on the LCD 16 to be operable as a touch button. The easy-maintenance button may be configured by a hard key so that operation of the hard key has the same effect as depression of the easy-maintenance button. Alternatively, the effect of depression of the easy-maintenance button may be achieved by depression of a plurality of preselected hard keys in a predetermined sequence. In the case of using the hard keys to have an effect of depression of the easy-maintenance button, it is designed so that operations of one or more hard keys are effective only when the MFP 1 is in a state in which entry into the easy-maintenance mode has been permitted. Stated differently, it is designed so that detection as to whether or not one or more hard keys are properly operated does not start until the MFP 1 is held in a state in which entry into the easy-maintenance mode has been permitted. By so designing, even if the easy-maintenance button is depressed or one or more hard keys are properly operated to have an effect of depression of the easy-maintenance button, the key operations are not accepted if the MFP 2 is not permitted to enter into the easy-maintenance mode. Non-acceptance of the hard key operations would suggest that entry into the easy-maintenance mode is not permitted.

The above-described embodiment may be modified to additionally display on the LCD 16 an operation sequence including operations of the easy-maintenance button 161 or 162 and the easy-maintenance menu. The operation sequence includes the user operations performed in accordance with instructions of the operator in the call center. Accordingly, the user's operability is enhanced. Moreover, if the LCD 16 is controlled so that each phase of the operation sequence is displayed at a proper timing on the LCD 16, the operability is further enhanced.

What is claimed is:

1. An image forming apparatus comprising:
a communication section communicable with an external device;
a mode changing section configured to change an operation mode from a first mode to a second mode wherein settings of the image forming apparatus falling in a prescribed category are not changeable in the first mode but changeable in the second mode through user's operations;
a communication status determining section configured to determine that communications between the communication section and the external device are established;
a mode change enabling section that enables the mode changing section to change the operation mode from the first mode to the second mode based on a determination that the communication status determining section determines that communications between the communication section and the external device are established; and
a mode change disabling section that disables the change of the operation mode from the first mode to the second mode when the communication status determining section determines that communications between the communication section and the external device are not established.

2. The image forming apparatus according to claim 1, further comprising:

a permission signal detecting section configured to detect a permission signal transmitted from the external device to the communication section during the communications between the communication section and the external device, the permission signal representing permission to change the operation mode from the first mode to the second mode, wherein the mode change enabling section enables the mode changing section to change the operation mode from the first mode to the second mode under a condition where the permission signal detecting section detects the permission signal after the communication status determining section determines that communications between the communication section and the external device are established.

3. The image forming apparatus according to claim 2, further comprising:

a display device having a display area and a touch screen and displaying images on the display area, the touch screen being capable of detecting presence and location of a touch within the display area, wherein the display device displays an image of an entry button in a predetermined position on the display area, and user's mode change operations for changing the operation mode from the first mode to the second mode is accepted when the image of an entry button is touched through the touch screen.

4. The image forming apparatus according to claim 3, wherein the display device displays the image of an entry button when the mode changing section is allowed to change the operation mode from the first mode to the second mode by the mode change enabling section.

5. The image forming apparatus device according to claim 4, further comprising:

an investigation section configured to investigate status of the image forming apparatus and determine if the user's mode change operation needs to be performed based on results of investigation; and a display mode determining section configured to determine a display mode of the image of an entry button based on determination made by the investigation section, wherein the display device displays an image of an entry button in accordance with the display mode determined by the display mode determining section.

6. The image forming apparatus according to claim 5, wherein the display mode determining section determines a size of the image of an entry button to be large as a level required for changing the operation mode from the first mode to the second mode increases.

7. The image forming apparatus according to claim 2, further comprising:

an instruction accepting section configured to accept user's mode change operations for changing the operation mode from the first mode to the second mode; and an instruction detecting section configured to detect the user's mode change operations accepted in the instruction accepting section, wherein the mode changing section changes the operation mode from the first mode to the second mode when the instruction detecting section detects the user's mode change operations.

8. The image forming apparatus according to claim 7, wherein the mode changing section changes the operation mode from the first mode to the second mode in response to the user's mode change operations validly accepted in the instruction accepting section.

9. The image forming apparatus according to claim 1, further comprising:

a storage device that stores identification information identifying the external device;

an acquiring section configured to acquire identification information of a device with which the communication section communicates; and an identification information verifying section configured to verify that the identification information acquired by the acquiring section is in coincidence with the identification information stored in the storage device, wherein the communication status determining section determines that communications between the communication section and the external device are established when the identification information verifying section verifies that the identification information acquired by the acquiring section is in coincidence with the identification information stored in the storage device.

10. The image forming apparatus according to claim 1, wherein the mode changing section is further configured to change the operation mode from the second mode to the first mode when the communication status determining section determines that communications between the communication section and the external device are not established.

11. A method of controlling an image forming apparatus to be selectively operable in a first mode and a second mode wherein settings of the image forming apparatus falling in a prescribed category are not changeable in the first mode but changeable in the second mode through user's operations, the method comprising:

determining that communications between the image forming apparatus and the external device are established;

enabling the operation mode to change from the first mode to the second mode after execution of the determining step;

changing the operation mode from the first mode to the second mode after execution of the enabling step; and disabling the operation mode from changing from the first mode to the second mode when communications between the image forming apparatus and the external device are not established.

12. The method according to claim 11, further comprising:

detecting a permission signal transmitted from the external device to the image forming apparatus during the communications between the image forming apparatus and the external device, the permission signal representing permission to change the operation mode from the first mode to the second mode, wherein the enabling step is executed after execution of the determining step and the permission signal detecting step.

13. The method according to claim 12, further comprising:

accepting user's mode change operations for changing the operation mode from the first mode to the second mode; and detecting the user's mode change operations accepted in the accepting step, wherein the changing step is executed after execution of the user's mode change operations detecting step.

14. The method according to claim 13, wherein the user's mode change operations are validly accepted after execution of the enabling step.

15. The method according to claim 12, further comprising:
displaying an image of entry button in a predetermined position on a display area of a display device having a touch screen capable of detecting presence and location of a touch within the display area,
wherein the user's mode change operations are accepted when the image of entry button is touched through the touch screen.

16. The method according to claim 15, wherein the displaying step is executed after execution of the enabling step.

17. The method according to claim 16, further comprising:
investigating status of the image forming apparatus and determining if the user's mode change operations need to be performed based on results of investigation; and
determining a display mode of the image of an entry button based on determination made in the investigating step,
wherein the displaying step displays the image of an entry button in accordance with the display mode determined by the determining step.

18. The method according to claim 17, wherein the determining step determines a size of the image of an entry button to be large as a level required for changing the operation mode from the first mode to the second mode increases.

19. The method according to claim 11, further comprising:
storing identification information identifying the external device;
acquiring identification information of a device with which the image forming apparatus communicates; and
verifying that the identification information acquired in the acquiring step is in coincidence with the identification information stored in the storing step,
wherein the determining step determines that communications between the image forming apparatus and the external device are established when the verifying step verifies that the identification information acquired in the acquiring step is in coincidence with the identification information stored in the storing step.

20. The method according to claim 11, further comprising changing the operation mode from the second mode to the first mode when the determining step determines that communications between the image forming apparatus and the external device are not established.

21. A computer-readable storage device storing a set of program instructions installed on and executed by a computer for controlling an image forming apparatus to be selectively operable in a first mode and a second mode wherein settings of the image forming apparatus falling in a prescribed category are not changeable in the first mode but changeable in the second mode through user's operations, the set of program instructions comprising:
determining that communications between the image forming apparatus and the external device are established;
enabling the operation mode to change from the first mode to the second mode after execution of the determining program instruction;
changing the operation mode from the first mode to the second mode after execution of the enabling program instruction; and
disabling the operation mode from changing from the first mode to the second mode when communications between the image forming apparatus and the external device are not established.

22. The computer-readable storage device according to claim 21, further comprising:
detecting a permission signal transmitted from the external device to the image forming apparatus during the communications between the image forming apparatus and the external device, the permission signal representing permission to change the operation mode from the first mode to the second mode,
wherein the enabling step is executed after execution of the determining program instruction and the permission signal detecting program instruction.

23. The computer-readable storage device according to claim 22, further comprising:
accepting user's mode change operations for changing the operation mode from the first mode to the second mode; and
detecting the user's mode change operations accepted in the accepting program instruction,
wherein the changing program instruction is executed after execution of the user's mode change operations detecting program instruction.

24. The computer-readable storage device according to claim 23, wherein the user's mode change operations are validly accepted after execution of the enabling program instruction.

25. The computer-readable storage device according to claim 22, further comprising:
displaying an image of entry button in a predetermined position on a display area of a display device having a touch screen capable of detecting presence and location of a touch within the display area,
wherein the user's mode change operations are accepted when the image of entry button is touched through the touch screen.

26. The computer-readable storage device according to claim 25, wherein the displaying program instruction is executed after execution of the enabling program instruction.

27. The computer-readable storage device according to claim 26, further comprising:
investigating status of the image forming apparatus and determining if the user's mode change operations need to be performed based on results of investigation; and
determining a display mode of the image of an entry button based on determination made in the investigating program instruction,
wherein the displaying program instruction displays the image of an entry button in accordance with the display mode determined by the determining program instruction.

28. The computer-readable storage device according to claim 27, wherein the determining program instruction determines a size of the image of an entry button to be large as a level required for changing the operation mode from the first mode to the second mode increases.

29. The computer-readable storage device according to claim 21, further comprising:
storing identification information identifying the external device;
acquiring identification information of a device with which the image forming apparatus communicates; and
verifying that the identification information acquired in the acquiring step is in coincidence with the identification information stored in the storing instruction program,
wherein the determining program instruction determines that communications between the image forming apparatus and the external device are established when the verifying program instruction verifies that the identification information acquired in the acquiring program instruction is in coincidence with the identification information stored in the storing program instruction.

30. The computer-readable storage device according to claim 21, further comprising changing the operation mode from the second mode to the first mode when the determining program instruction determines that communications between the image forming apparatus and the external device are not established.

* * * * *